(12) United States Patent
Malladi et al.

(10) Patent No.: US 8,369,299 B2
(45) Date of Patent: Feb. 5, 2013

(54) METHOD AND APPARATUS FOR MULTIPLEXING CDM PILOT AND FDM DATA

(75) Inventors: Durga Prasad Malladi, San Diego, CA (US); Hao Xu, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 973 days.

(21) Appl. No.: 12/116,081

(22) Filed: May 6, 2008

(65) Prior Publication Data

US 2008/0279170 A1    Nov. 13, 2008

Related U.S. Application Data

(60) Provisional application No. 60/916,348, filed on May 7, 2007.

(51) Int. Cl.
*H04J 1/00* (2006.01)
(52) U.S. Cl. .......................................... 370/343
(58) Field of Classification Search .................. 370/343
See application file for complete search history.

(56) References Cited

U.S. PATENT DOCUMENTS

| | | | | |
|---|---|---|---|---|
| 7,639,660 | B2* | 12/2009 | Kim et al. ...................... | 370/343 |
| 2006/0050676 | A1 | 3/2006 | Mansour | |
| 2007/0014272 | A1* | 1/2007 | Palanki et al. ................ | 370/344 |
| 2007/0040703 | A1 | 2/2007 | Akkarakaran et al. | |
| 2008/0232504 | A1* | 9/2008 | Ma et al. ........................ | 375/267 |
| 2009/0220017 | A1* | 9/2009 | Kawamura et al. ........... | 375/260 |

FOREIGN PATENT DOCUMENTS

| | | | |
|---|---|---|---|
| CN | 1801680 A | * | 7/2006 |
| EP | 1871124 A1 | | 12/2007 |
| JP | 2000049744 | | 2/2000 |
| JP | 2001274655 | | 10/2001 |
| JP | 2002077103 | | 3/2002 |
| JP | 2005252677 A | | 9/2005 |
| JP | 2007500486 A | | 1/2007 |
| RU | 2154923 | | 8/2000 |
| WO | WO2004102816 A2 | | 11/2004 |

(Continued)

OTHER PUBLICATIONS

3rd Generation Partnership Project: Physical layer aspects for evolved Universal Terrestrial Radio Access (UTRA), Release 7, 3GPP TSG RAN WG1 Release 7, Jun. 1, 2006, XP002474356, subsections 9.1.1.2.2 and 9.1.1.2.3, figures 9.1.1.2.2-3, 9.1.1.2.2-4.

(Continued)

*Primary Examiner* — Derrick Ferris
*Assistant Examiner* — Saad A Waqas
(74) *Attorney, Agent, or Firm* — Liem T. Do

(57) ABSTRACT

Techniques for sending control information in a wireless communication system are described. In an aspect, a user equipment (UE) may send data for control information in a resource block with frequency division multiplexing (FDM) and may send pilot in the resource block with frequency-domain code division multiplexing (CDM). The UE may determine multiple groups of subcarriers to use to send data in multiple symbol periods of the resource block based on a predetermined pattern or a pseudo-random hopping pattern. Each group may include consecutive subcarriers to support localized FDM. The multiple groups may include different subcarriers to provide frequency diversity and possibly interference averaging. The UE may send modulation symbols for data (e.g., in the time domain) on the multiple groups of subcarriers in the multiple symbol periods. The UE may send a reference signal sequence for pilot on multiple subcarriers in each symbol period for pilot.

26 Claims, 12 Drawing Sheets

FOREIGN PATENT DOCUMENTS

| WO | 2005122517 A1 | 12/2005 |
|----|---------------|---------|
| WO | 2006109439 A1 | 10/2006 |
| WO | 07019555 | 2/2007 |
| WO | WO2007051187 | 5/2007 |

OTHER PUBLICATIONS

ETRI: Cyclic-shift hopping for uplink sounding reference signal 3GPP TSG RAN WG1 Meeting #48IS, vol. R1-070213, Jan. 15, 2007, XP002482750 Sorrento, Italy.

International Search Report and Written Opinion—PCT/US2008/062964, International Search Authority—European Patent Office—Mar. 4, 2009.

Kawamura T et al: "Layer 1 / Layer 2 control channel structure in single-carrier FDMA based evolved UTRA uplink" Proceedings of the IEEE Vehicular Technology Conference, Apr. 22, 2007, pp. 2941-2945, XP002483429.

NEC Group et al: "Reference signal multiplexing for EUTRA uplink" 3GPP TSG RAN WG1 Meeting #46, vol. RI-062121, Aug. 28, 2006, Tallinn, Estonia.

NTT Docomo et al: Orthogonal Pilot Channel Structure in EUTRA Uplinkll 3GPP TSG RAN WG1 LTE AD HOC Meeting, vol. R1-060046, Jan. 23, 2006, XP002482751 Helsinki, Finland.

NTT Docomo et al: "Pilot Sequence Allocation Method in EUTRA Uplink" 3GPP TSG RAN WG1 Meeting #46, vol. R1-062103, Aug. 28, 2006, XP050102648 Tallinn, Estonia.

Samsung: Reference signal structure for EUTRA uplinkll 3GPP TSG RAN WG1 Meeting #44IS, vol. R1-060818, Mar. 27, 2006, XP002510056 Athens,Greece.

Taiwan Search Report—TW097116890—TIPO—Nov. 28, 2011.

\* cited by examiner

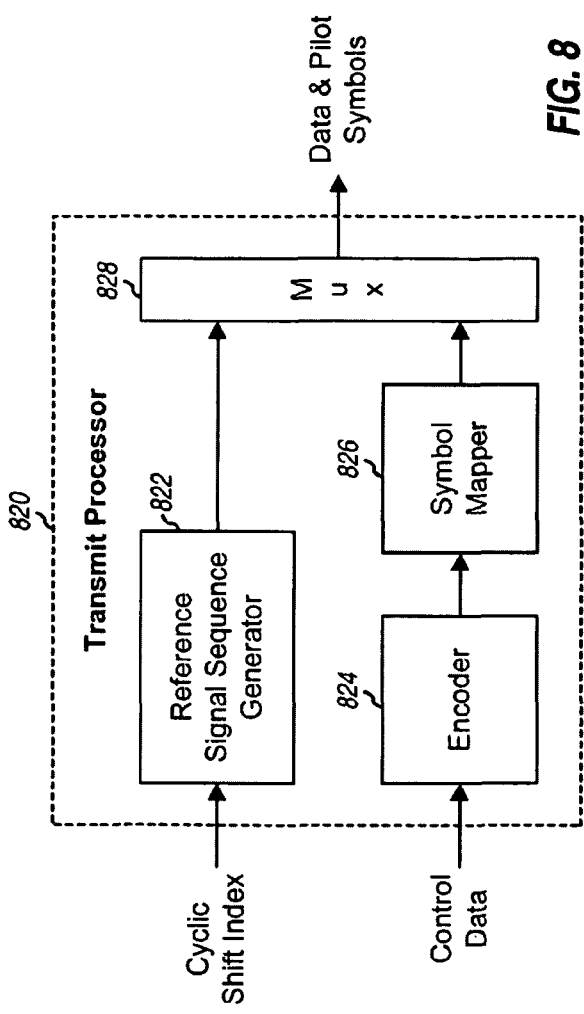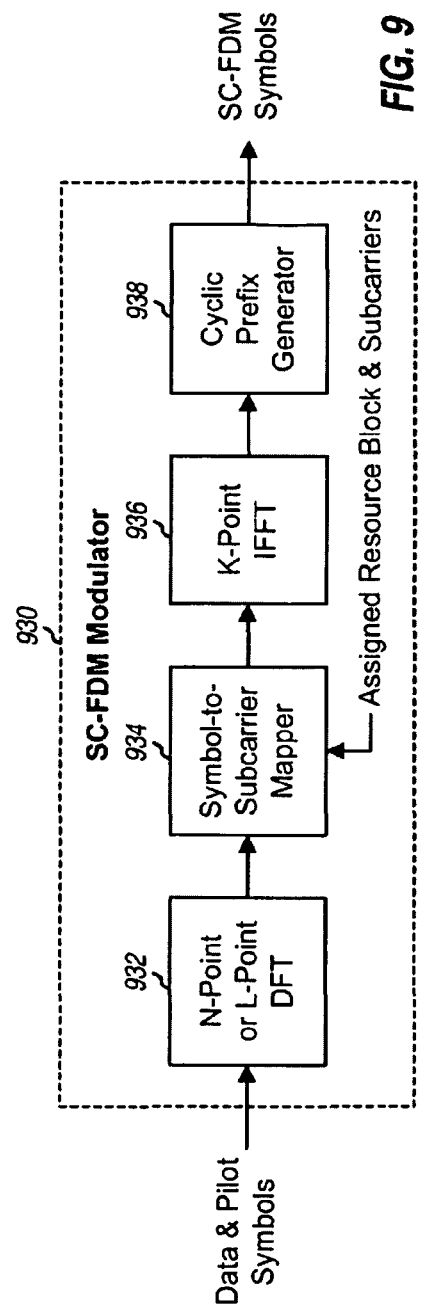

METHOD AND APPARATUS FOR MULTIPLEXING CDM PILOT AND FDM DATA

The present application claims priority to provisional U.S. Application Ser. No. 60/916,348, entitled "A METHOD AND APPARATUS FOR MULTIPLEXING OF CDM PILOT AND FDM DATA," filed May 7, 2007, assigned to the assignee hereof and incorporated herein by reference.

BACKGROUND

I. Field

The present disclosure relates generally to communication, and more specifically to techniques for transmitting data and pilot in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a Node B may transmit traffic data to a user equipment (UE) on the downlink and/or receive traffic data from the UE on the uplink. The downlink (or forward link) refers to the communication link from the Node B to the UE, and the uplink (or reverse link) refers to the communication link from the UE to the Node B. The UE may send channel quality indicator (CQI) information indicative of the downlink channel quality to the Node B. The Node B may select a rate or transport format based on the CQI information and may send traffic data at the selected rate or transport format to the UE. The UE may send acknowledgement (ACK) information for traffic data received from the Node B. The Node B may determine whether to retransmit pending traffic data or to transmit new traffic data to the UE based on the ACK information. It is desirable to efficiently send ACK and CQI information.

SUMMARY

Techniques for sending control information (e.g., ACK and/or CQI information) in a wireless communication system are described herein. In an aspect, a UE may send data for control information in a resource block with frequency division multiplexing (FDM) and may send pilot in the resource block with frequency-domain code division multiplexing (CDM). The resource block may comprise a plurality of subcarriers in a plurality of symbol periods. For FDM data, each subcarrier in each symbol period may be used by at most one UE for sending data. For frequency-domain CDM pilot, the pilots from different UEs may be distinguished by different orthogonal sequences applied across subcarriers.

In one design, a UE may determine multiple groups of subcarriers to use to send data in multiple symbol periods of the resource block based on a predetermined pattern or a pseudo-random hopping pattern. Each group may include consecutive subcarriers to support localized FDM. The multiple groups may include different subcarriers to provide frequency diversity and possibly interference averaging. The UE may send modulation symbols for data (e.g., in the time domain) on the multiple groups of subcarriers in the multiple symbol periods. The UE may send a reference signal sequence for pilot on the plurality of subcarriers in each symbol period for pilot in the resource block. Different UEs may be assigned different reference signal sequences having good correlation properties, and each UE may send its reference signal sequence on the plurality of subcarriers in each symbol period for pilot.

Various aspects and features of the disclosure are described in further detail below.

BRIEF DESCRIPTION OF THE DRAWINGS

FIG. 8 shows a block diagram of a transmit processor at the UE.

FIG. 9 shows a block diagram of an SC-FDM modulator at the UE.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
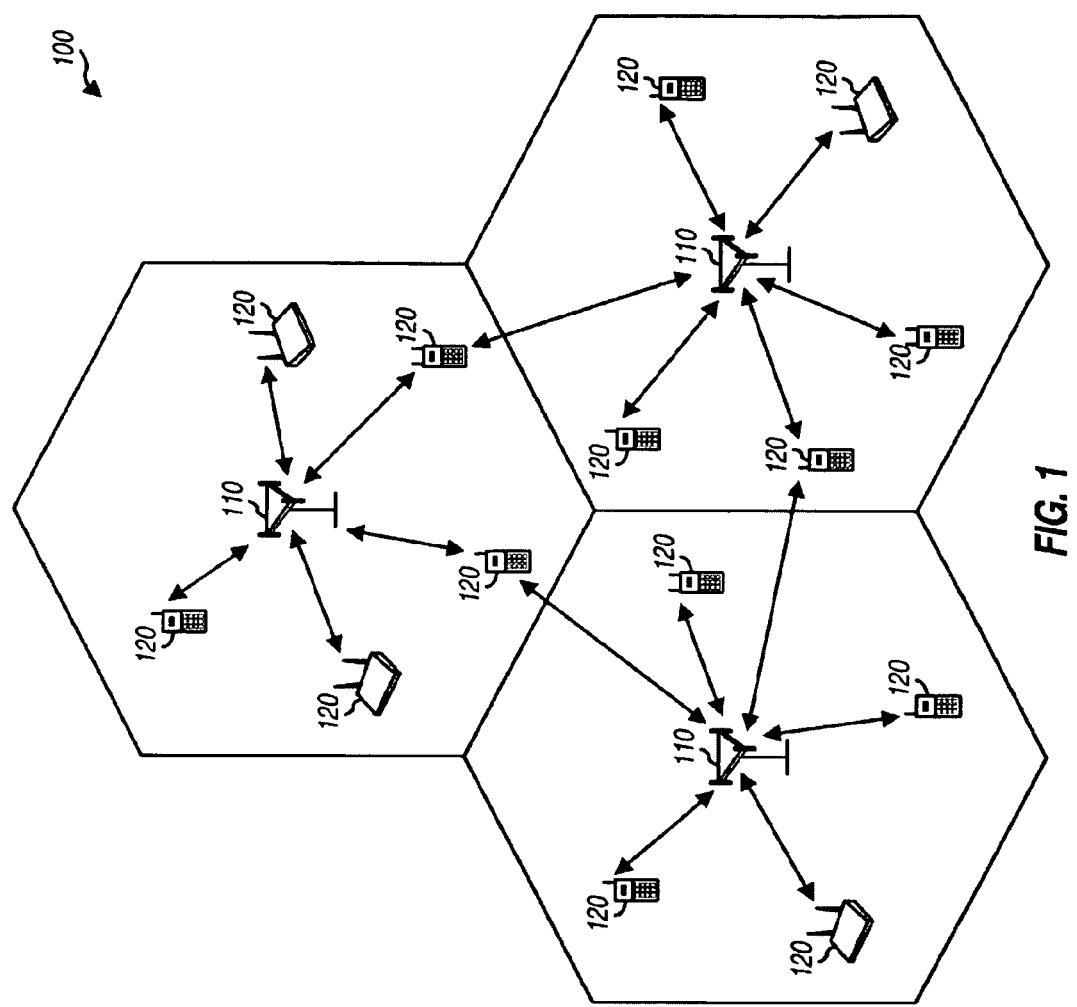
FIG. 1 shows a wireless communication system.

FIG. 1 shows a wireless communication system 100 with multiple Node Bs 110. A Node B may be a fixed station that communicates with the UEs and may also be referred to as an evolved Node B (eNB), a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc.

Figure 2:
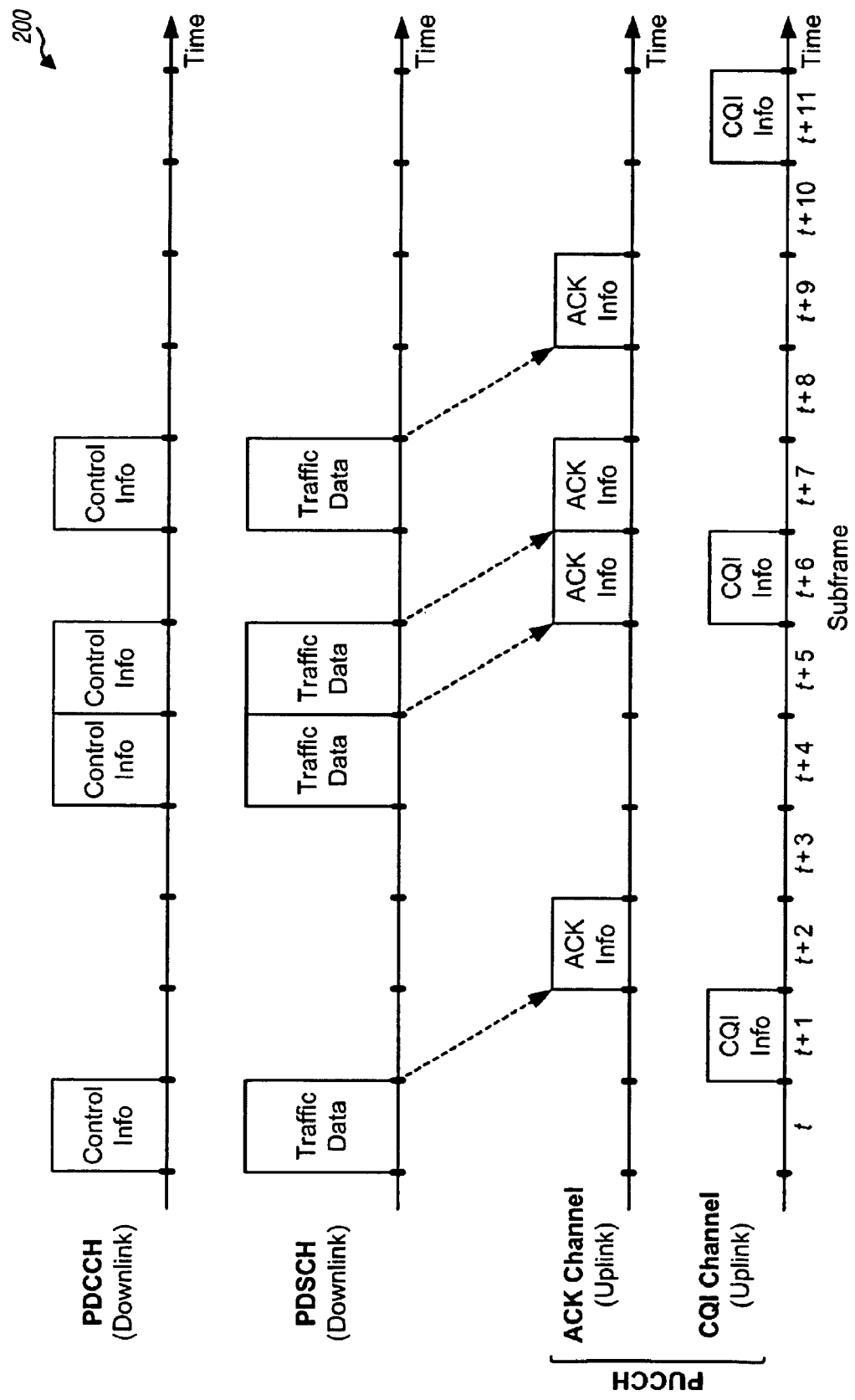
FIG. 2 shows example downlink and uplink transmissions.

FIG. 2 shows example downlink transmission by a Node B and example uplink transmission by a UE. The transmission timeline may be partitioned into units of subframes, with each subframe having a predetermined duration, e.g., one millisecond (ms). The UE may periodically estimate the downlink channel quality for the Node B and may send CQI information on a CQI channel to the Node B. The Node B may use the CQI information and/or other information to select the UE for downlink transmission and to select a suitable transport format (e.g., a modulation and coding scheme) for the UE. The Node B may process a transport block to obtain a codeword. The Node B may then send a transmission of the codeword on a physical downlink shared channel (PDSCH) and may send corresponding control information on a physical downlink control channel (PDCCH) to the UE. The UE may process the codeword transmission from the Node B and may send ACK information on an ACK channel. The ACK and CQI channels may be part of a physical uplink control channel (PUCCH). The ACK information may comprise an ACK if the codeword is decoded correctly or a negative acknowledgement (NAK) if the codeword is decoded in error. The Node B may send another transmission of the codeword if a NAK is received and may send a transmission of a new codeword if an ACK is received. FIG. 2 shows an example in which the ACK information is delayed by two subframes. The ACK information may also be delayed by some other amount.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. In LTE, the spacing between adjacent subcarriers is fixed, and the total number of subcarriers (K) is dependent on the system bandwidth. Each subcarrier may be modulated with data. In general, modulation symbols are sent in the frequency domain with OFDM and in the time domain with SC-FDM.

Figure 3:
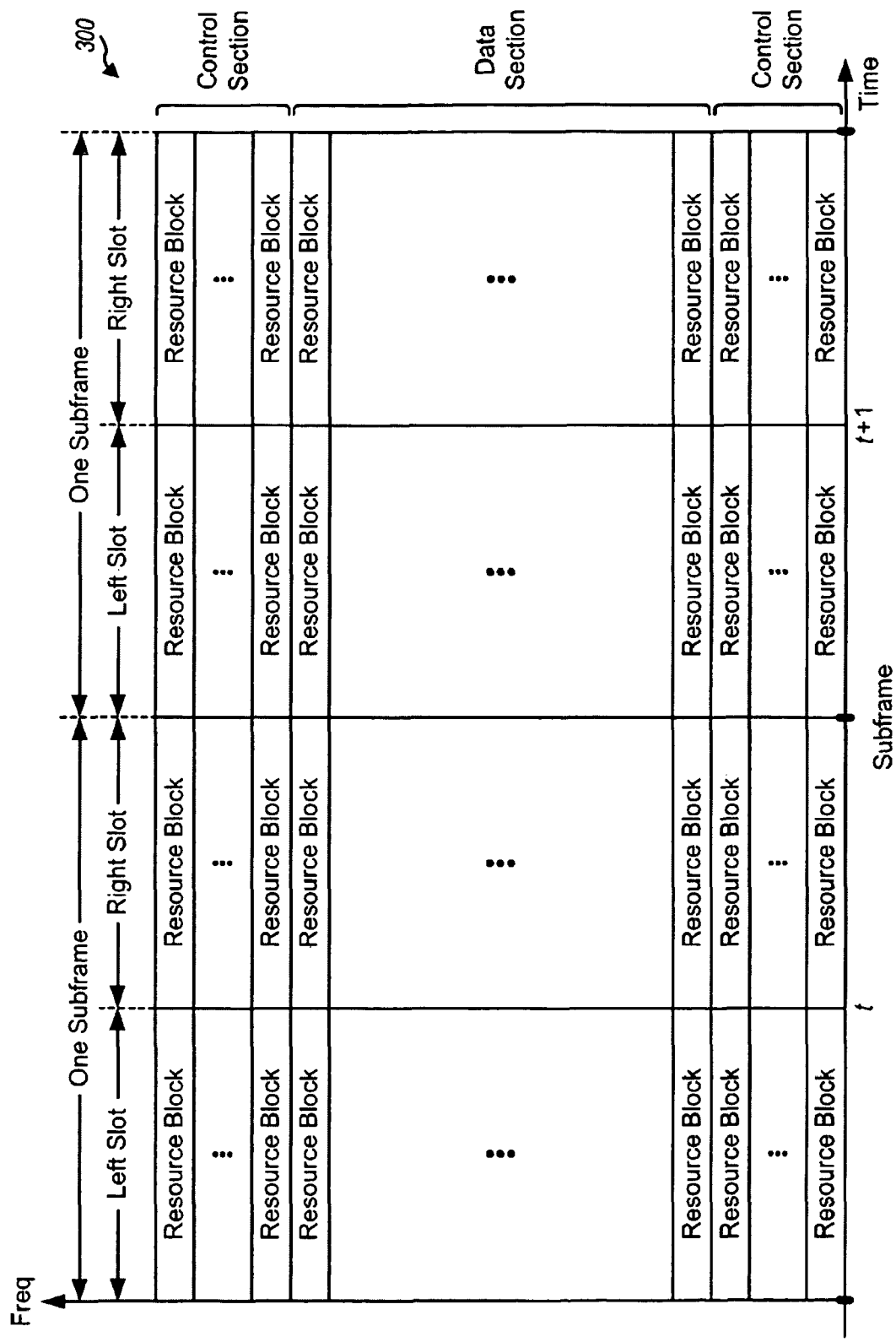
FIG. 3 shows an example transmission structure for the uplink.

FIG. 3 shows a design of a transmission structure 300 that may be used for the uplink. Each subframe may be partitioned into two slots. Each slot may include a fixed or configurable number of symbol periods, e.g., six symbol periods for an extended cyclic prefix or seven symbol periods for a normal cyclic prefix.

The available time frequency resources for the uplink may be partitioned into resource blocks. A resource block may comprise a block of N subcarriers in M symbol periods, where in general N and M may each be any integer value. For LTE, a resource block includes N=12 subcarriers in one slot of six or seven symbol periods. A resource block may also be referred to as a tile, a time frequency block, etc.

The resource blocks available for the uplink may be divided into a data section and a control section. The control section may be formed at the two edges of the system bandwidth, as shown in FIG. 3. The control section may have a configurable size, which may be selected based on the amount of control information being sent on the uplink by the UEs. The resource blocks in the control section may be assigned to the UEs for transmission of ACK information, CQI information, etc. The data section may include all resource blocks not included in the control section. In general, any subset of the available resource blocks may be used to send control information, and remaining resource blocks may be used to send traffic data.

A UE may be assigned resource blocks in the control section to transmit ACK and/or CQI information to a Node B. The ACK information may convey whether each transport block sent by the Node B to the UE is decoded correctly or in error by the UE. The CQI information may convey the downlink channel quality estimated by the UE for the Node B.

The techniques described herein may be used for various control and data channels. For clarity, certain aspects of the techniques are described below for the CQI channel. In one design, the CQI channel may carry only CQI information or both ACK and CQI information. In one design, the CQI channel may carry 8, 9 or 10 information bits in one resource block pair. In general, the CQI channel may carry CQI and/or other information and may carry any number of information bits.

Multiple CQI channels from different UEs may be multiplexed on the same resource block pair to improve resource utilization. The multiplexing may be achieved with frequency-domain CDM, time-domain CDM, FDM, and/or other multiplexing schemes. CDM refers to the use of orthogonal sequences to distinguish multiple transmissions sent simultaneously on the same resources. For frequency-domain CDM, the transmissions from different UEs may be distinguished by different orthogonal sequences applied across subcarriers. For time-domain CDM, the transmissions from different UEs may be distinguished by different orthogonal sequences applied across symbol periods. The orthogonal sequences may be Walsh sequences, sequences obtained from a discrete Fourier transform (DFT) matrix, constant amplitude zero auto correlation (CAZAC) sequences, or some other sequences having good correlation properties. For FDM, the transmissions from different UEs may be sent on different subcarriers such that each subcarrier is used by at most one UE.

Figure 4:
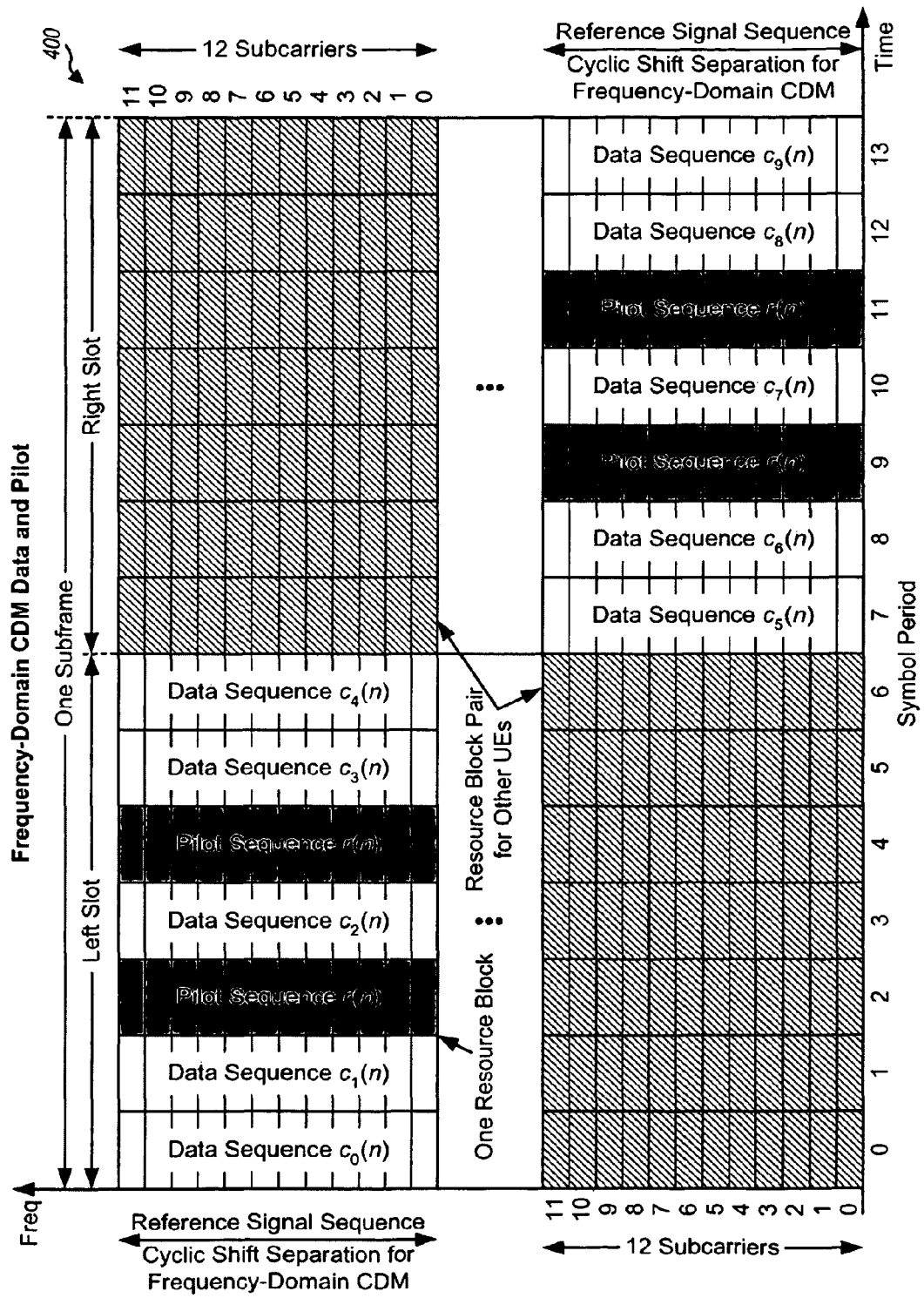
FIG. 4 shows a control channel structure with frequency-domain CDM data and pilot.

FIG. 4 shows a design of a control channel structure 400 with frequency-domain CDM data and pilot. In one design, for each subframe, the left slot includes seven symbol periods 0 through 6, and the right slot includes seven symbol periods 7 through 13. A set of CQI channels from different UEs may be multiplexed on a resource block pair that may include either (i) one resource block in the top control section in the left slot and one resource block in the bottom control section in the right slot, as shown in FIG. 4, or (ii) one resource block in the bottom control section in the left slot and one resource block in the top control section in the right slot (shown with diagonal hashing in FIG. 4). In the design shown in FIG. 4, each resource block for CQI includes five symbol periods for data and two symbol periods for pilot. Data and pilot for the CQI channels may also be sent in other manners (e.g., at other locations) within a resource block. For example, pilot may be sent in symbol periods 1 and 5, and data may be sent in symbol periods 0, 2, 3, 4 and 6.

Data and pilot for the CQI channels may be sent in various manners. In one design of frequency-domain CDM, data and pilot may be sent using reference signal sequences having good correlation properties. A set of reference signal sequences may be generated with a base sequence, which may be (i) a CAZAC sequence such as a Chu sequence, a Zardoff-Chu sequence, a Frank sequence, or a generalized chirp-like (GCL) sequence or (ii) a sequence defined to have good correlation properties.

In one design, six reference signal sequences of length N=12 may be generated with six different cyclic shifts of a base sequence of length 12, as follows:

$$r_a(n)=r_b((n+a) \bmod N), \text{ for } n=0, \ldots, N-1, \quad \text{Eq (1)}$$

where $r_b(n)$ is the base sequence, with n being a symbol index,
$r_a(n)$ is a reference signal sequence with a cyclic shift of α, and
"mod" denotes a modulo operation.

The six reference signal sequences may be orthogonal to one another (i.e., have zero or low cross-correlation) and may be sent simultaneously on a set of N subcarriers in one symbol period for frequency-domain CDM. Up to six UEs may be assigned up to six different reference signal sequences. Each UE may send data and pilot using its assigned reference signal sequence. Different UEs may simultaneously send their data and pilot on the same resource block pair, and their transmissions may be distinguished by the separation of the reference signal sequences in the frequency domain.

A UE may process data and pilot for frequency-domain CDM as follows. For data, the UE may encode information bits to obtain code bits and may map these code bits to ten modulation symbols d(0) through d(9). The UE may then modulate its reference signal sequence r(n) with each modulation symbol d(m), as follows:

$$c_m(n)=d(m) \cdot r(n), \text{ for } n=0, \ldots, N-1 \text{ and } m=0, \ldots, 9, \quad \text{Eq (2)}$$

where $c_m(n)$ is a data sequence for symbol period m. The UE may generate ten data sequences $c_0(n)$ to $c_9(n)$ for the ten modulation symbols d(0) to d(9), respectively. The UE may send these ten data sequences in ten symbol periods for data in one resource block pair, e.g., as shown in FIG. 4.

For pilot, the UE may use its reference signal sequence r(n) directly as a pilot sequence. The UE may send its reference signal sequence in each symbol period for pilot, e.g., as shown in FIG. 4.

For the design shown in FIG. 4, data and pilot transmissions from different UEs are multiplexed by different cyclic shifts of the same base sequence to obtain frequency-domain CDM. Up to 6 UEs may be multiplexed within one resource block pair with up to six different reference signal sequences. Each UE may send ten modulation symbols in ten symbol periods of the resource block pair. Due to dimension limit, the code rate for data may become high with a large payload size of more than 10 information bits.

Figure 5:
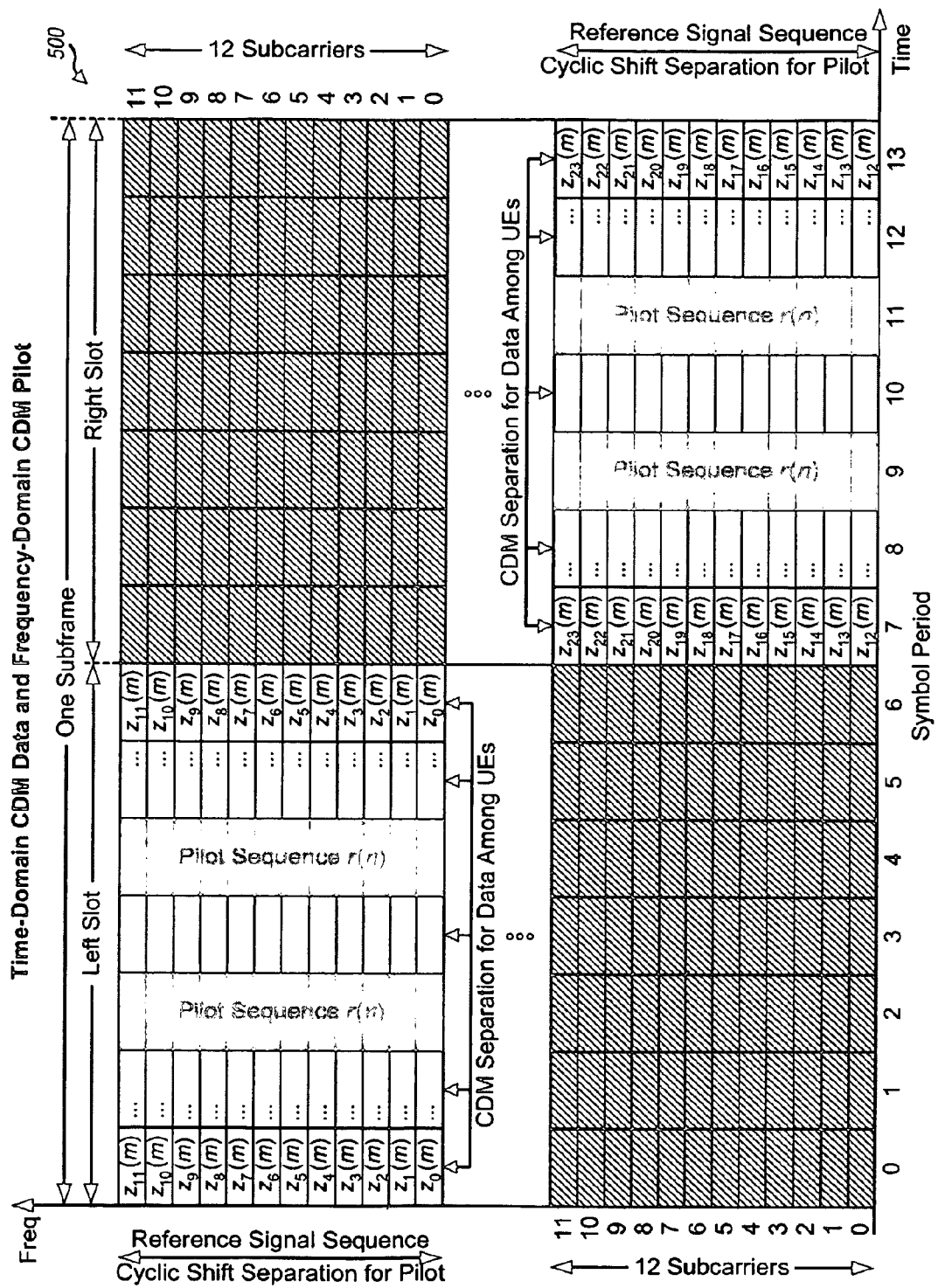
FIG. 5 shows a control channel structure with time-domain CDM data and frequency-domain CDM pilot.

FIG. 5 shows a design of a control channel structure 500 with time-domain CDM data and frequency-domain CDM pilot. In one design of time-domain CDM data, a UE may spread its data across multiple symbol periods with an orthogonal sequence. A set of orthogonal sequences may be generated based on a Walsh matrix, a DFT matrix, etc. Each UE may be assigned a different orthogonal sequence. Multiple UEs may simultaneously send their data on the same resource block pair with different orthogonal sequences. The data transmissions from these UEs may be distinguished by the spreading with the orthogonal sequences in the time domain.

A UE may process data for time-domain CDM as follows. The UE may encode information bits to obtain code bits and may map the code bits to modulation symbols. The UE may send half of the modulation symbols in the resource block in the left slot and the other half of the modulation symbols in the resource block in the right slot. The UE may spread each modulation symbol d(k) across one resource block as follows:

$$z_k(m)=d(k) \cdot w(m) \text{ for } k=0, \ldots, N-1 \text{ and } m=0, \ldots, 4, \quad \text{Eq (3)}$$

where w(m) is an orthogonal sequence assigned to the UE for data, and
$z_k(m)$ is a data sequence for subcarrier k.

The UE may generate 12 data sequences $z_0(m)$ to $z_{11}(m)$ for 12 modulation symbols for the resource block in the left slot and may generate 12 data sequences $z_{12}(m)$ to $z_{23}(m)$ for 12 other modulation symbols for the resource block in the right slot. The UE may send each data sequence on one subcarrier across all symbol periods for data in one resource block, e.g., as shown in FIG. 5.

For pilot, the UE may be assigned a reference signal sequence r(n) and may use it directly as a pilot sequence. The UE may send the reference signal sequence for pilot as described above for FIG. 4.

For the design shown in FIG. 5, data transmissions from different UEs are separated by different orthogonal sequences to obtain time-domain CDM. Pilot transmissions from different UEs are multiplexed by different cyclic shifts of the same base sequence to obtain frequency-domain CDM. The design in FIG. 5 may provide better performance than the design in FIG. 4 for large payload. However, performance may degrade with high speed because time-domain orthogonality may not be valid with a fast time-varying channel. Furthermore, the number of UEs that can be multiplexed on one resource block pair may be limited by the number of orthogonal sequences for data, which may be equal to the number of symbol periods for data in each slot. For the design shown in FIG. 5, five orthogonal sequences may be defined and may be assigned to up to five UEs.

Figure 6A:
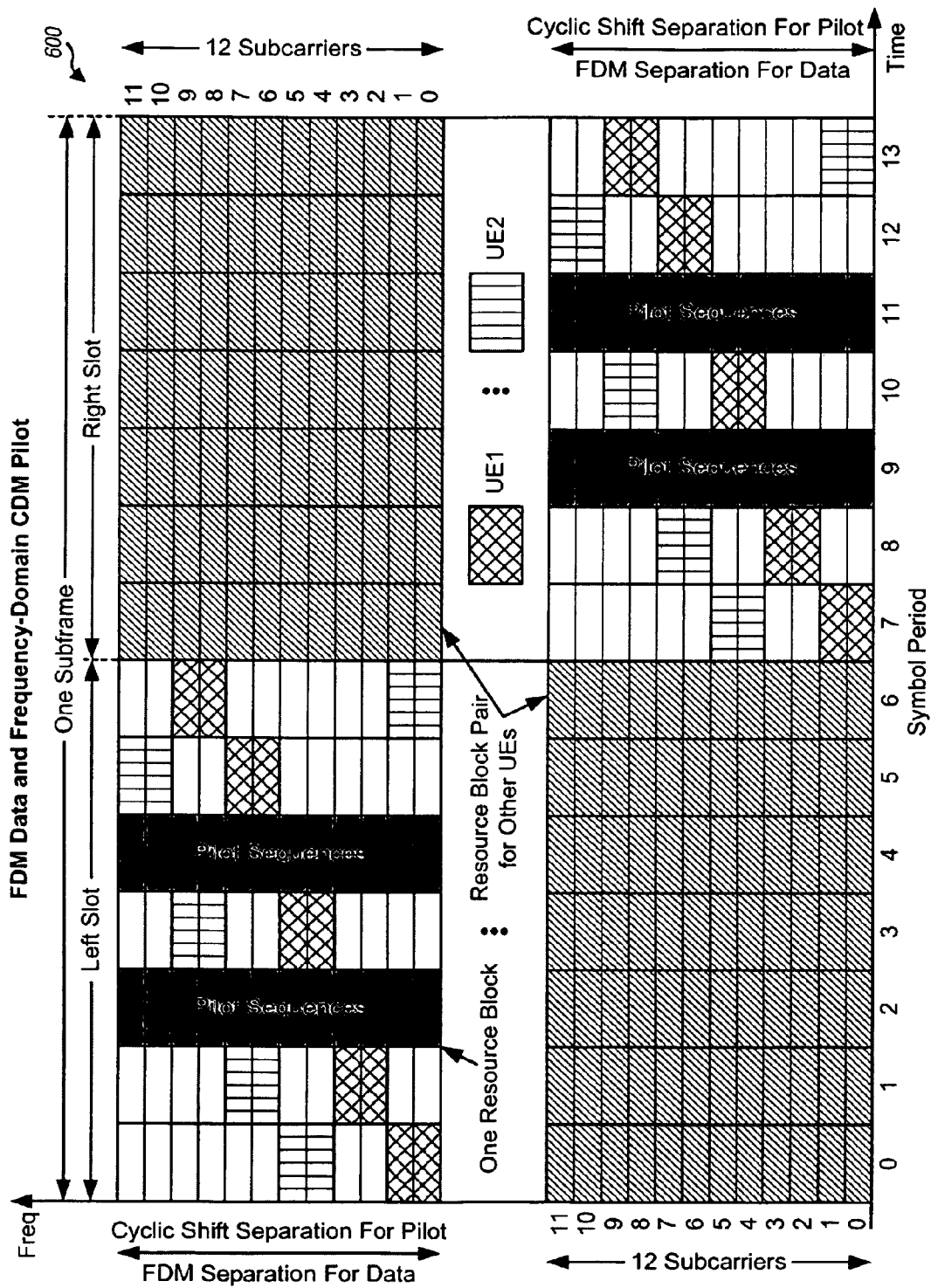
FIGS. 6A and 6B show two designs of a control channel structure with FDM data and frequency-domain CDM pilot.

FIG. 6A shows a design of a control channel structure 600 with FDM data and frequency-domain CDM pilot, which is also referred to as a hybrid FDM CDM structure. In one design of FDM data, the N subcarriers in each symbol period may be partitioned into multiple groups. Each group may include consecutive subcarriers to support localized FDM (LFDM) transmission, which may have lower peak-to-average power ratio (PAR) and is thus desirable. The multiple groups of subcarriers in each symbol period may be assigned to different UEs such that each subcarrier is used by at most one UE to send data. Each UE may send modulation symbols on each group of subcarriers assigned to that UE.

In the design shown in FIG. 6A, the 12 subcarriers in each symbol period are divided into six groups of two consecutive subcarriers. Group 0 includes subcarriers 0 and 1, group 1 includes subcarriers 2 and 3, and so on, and group 5 includes subcarriers 10 and 11. The six groups of subcarriers in each symbol period may be assigned to six different UEs. In general, each group may include L consecutive subcarriers, where L may be any integer value.

In one design, a UE may be assigned different groups of subcarriers in different symbol periods, which may provide frequency diversity. In one design, the different groups of subcarriers may be selected in a systematic manner based on a predetermined pattern. In the design shown in FIG. 6A, the UE may be assigned a sequentially increasing group of subcarriers (with wrap around) across symbol periods. For example, the UE may be assigned subcarriers 0 and 1 in group 0 in symbol period 0, subcarriers 2 and 3 in group 1 in symbol period 2, and so on, and subcarriers 8 and 9 in group 4 in symbol period 6. The UE may also be assigned different groups of subcarriers in different symbol periods based on some other predetermined pattern.

Figure 6B:
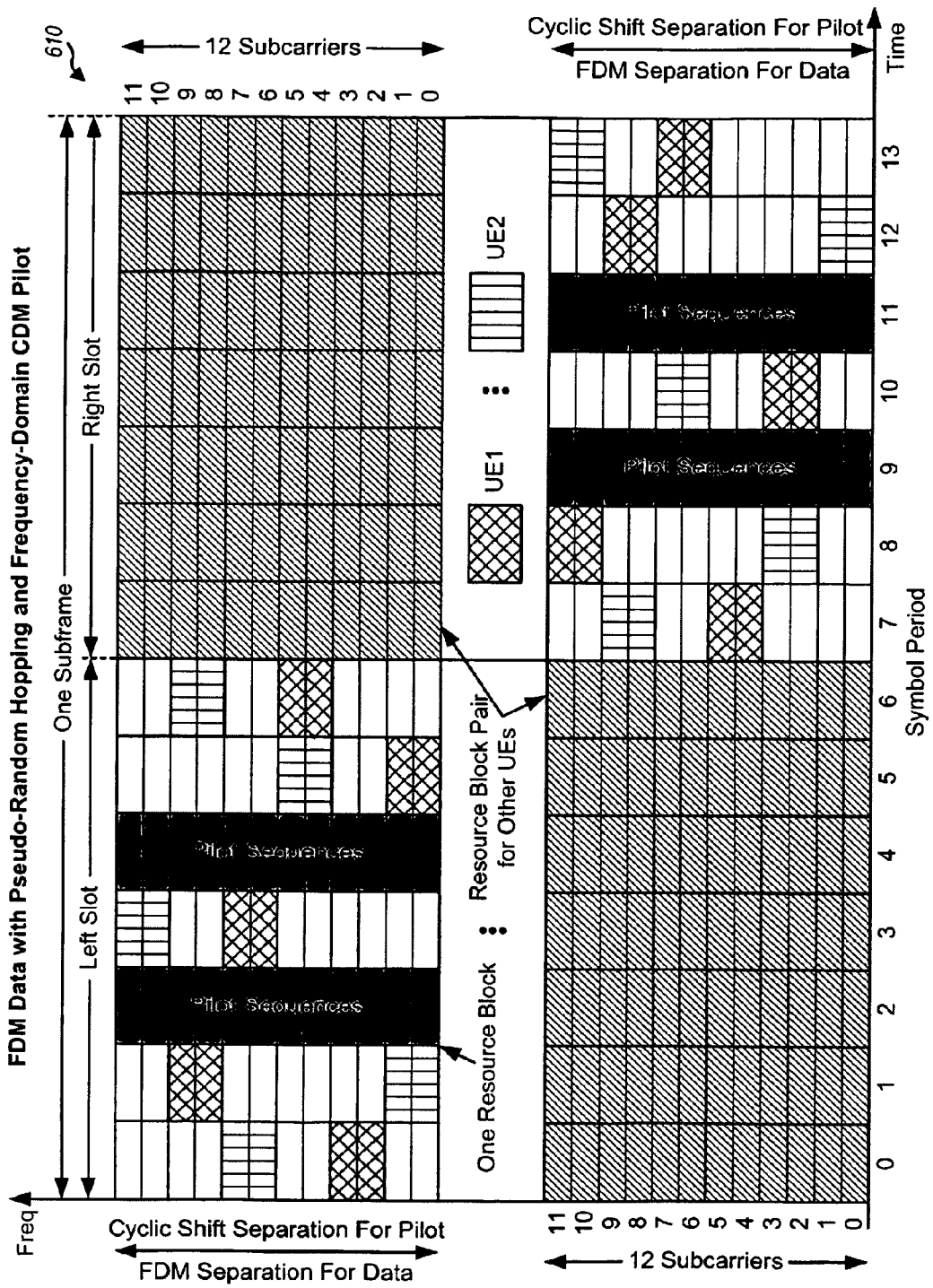

FIG. 6B shows a design of a control channel structure 610 with pseudo-random hopping for FDM data and frequency-domain CDM pilot. In this design, a UE may be assigned different groups of subcarriers that may be selected in a pseudo-random manner. In one design, a hopping pattern may pseudo-randomly select a group of subcarriers in each symbol period. Different UEs may be assigned different offsets from the hopping pattern. Each UE may determine its assigned group of subcarriers in each symbol period based on the hopping pattern common for all UEs sharing the resource block pair and the offset for that UE, as follows:

$$h_u(m)=[h(m)+o_u] \bmod G, \text{ for } o_u \in \{0, \ldots, G-1\}, \quad \text{Eq (4)}$$

where h(m) is the hopping pattern, $o_u$ is an offset assigned to UE u, G is the number of groups of subcarriers, and $h_u(m)$ indicates the group of subcarriers assigned to UE u in symbol period m.

The pseudo-random hopping in FIG. 6B may provide frequency diversity as well as interference averaging. Different cells may use different hopping patterns that may be pseudo-random with respect to each other. Each UE may then observe randomized interference from other UEs in neighbor cells, which may improve performance.

In another design, a UE may be assigned the same group of subcarriers for all symbol periods of a resource block. The group may include consecutive or non-consecutive subcarriers.

FIGS. 6A and 6B show two designs of FDM data. In general, a resource block may be partitioned into any number of groups of subcarriers. Each group may include any number of subcarriers that may be located anywhere within the resource block. The different groups may include the same or different numbers of subcarriers. The partitioning may be such that each subcarrier belongs in at most one group. Different UEs may be assigned different groups of subcarriers. In each symbol period, different UEs may send their data on different subcarriers and would then be frequency division multiplexed.

Frequency-domain CDM pilot may be used in conjunction with FDM data, as shown in FIGS. 6A and 6B. In one design of frequency-domain CDM pilot, each UE may be assigned a different reference signal sequence and may use it directly as a pilot sequence, as described above for FIG. 4. The pilot transmissions from different UEs may be distinguished by the separation of the reference signal sequences in the frequency domain. A Node B may derive channel gain estimates for all N subcarriers in a resource block for each UE based on the reference signal sequence received from that UE. The Node B may use the channel gain estimates for each UE for coherent detection of data sent by that UE, regardless of which subcarriers are used by the UE to send the data. Frequency-domain CDM pilot may also be implemented in other manners.

The designs in FIGS. 6A and 6B with FDM data and frequency-domain CDM pilot may provide various advantages. First, data transmissions from different UEs are frequency division multiplexed, which solves the dimensional limit in the design shown in FIG. 4. FDM may allow for efficient transmission of large payload. Second, each UE may be assigned different subcarriers in different symbol periods (e.g., with systematic or pseudo-random hopping) to obtain frequency diversity and possibly interference averaging. Third, each UE may be assigned consecutive subcarriers in each symbol period to support LFDM transmission, which may provide lower PAR. Fourth, the frequency-domain CDM pilot may support channel estimation for all N subcarriers in a resource block. This may allow for coherent detection of data even with hopping. Computer simulations suggest that the designs in FIGS. 6A and 6B with FDM data and frequency-domain CDM pilot may provide better performance than the design in FIG. 4 with frequency-domain CDM data and pilot as well as the design in FIG. 5 with time-domain CDM data and frequency-domain CDM pilot.

The hybrid FDM CDM structure may be used for CQI channels, as described above. The hybrid FDM CDM structure may also be used for other control channels such as ACK channel, power control channels, feedback channels, etc. The hybrid FDM CDM structure may also be used for multiple control channels sent simultaneously. For example, a UE may send only CQI channel, or only ACK channel, or both ACK and CQI channels, as shown in FIG. 2. The UE may readily multiplex both ACK and CQI channels on the same resource block with the hybrid FDM CDM structure. For example, some subcarriers may be assigned for the CQI channel, and additional subcarriers may be assigned for the ACK channel.

Figure 7:
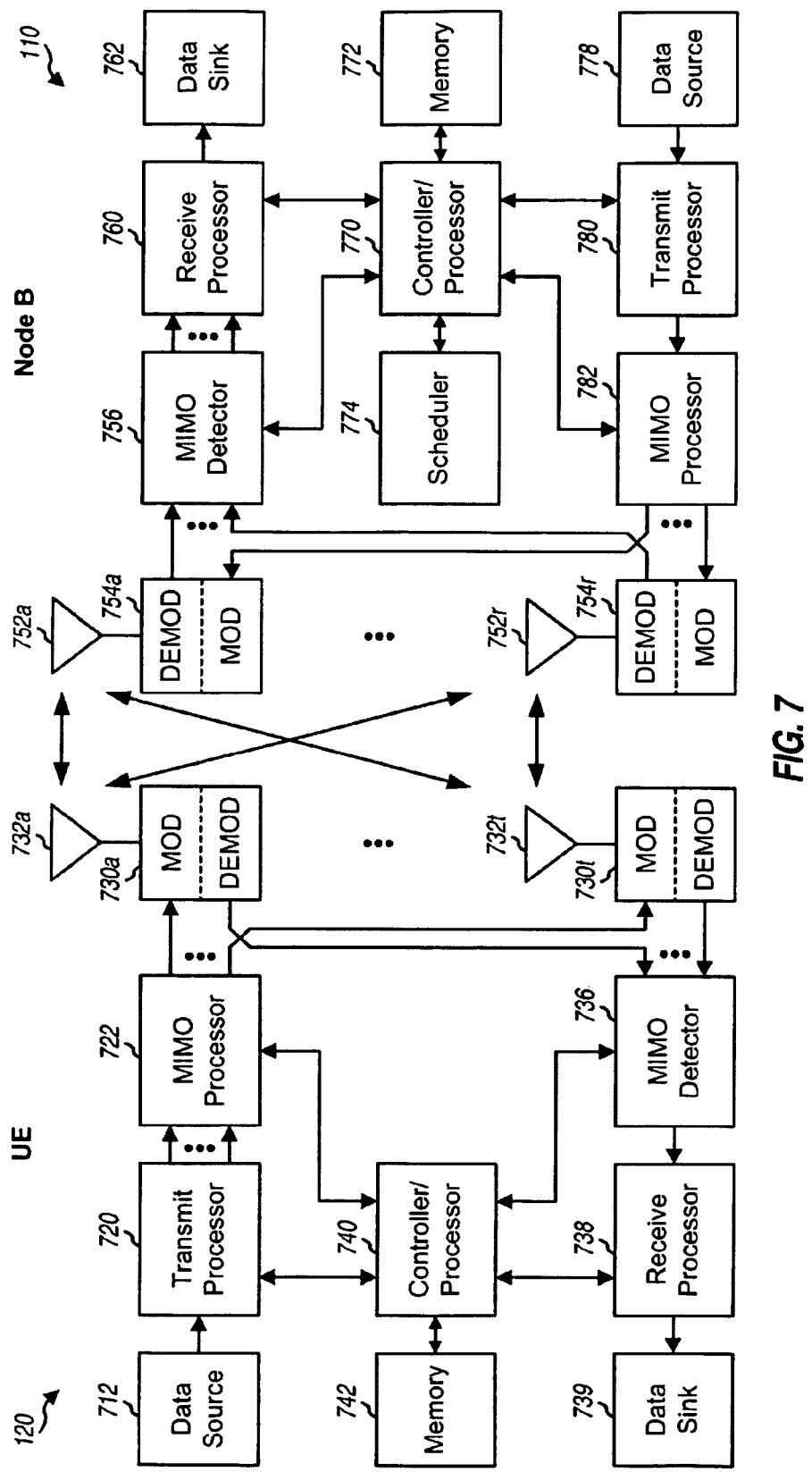
FIG. 7 shows a block diagram of a Node B and a UE.

FIG. 7 shows a block diagram of a design of a Node B 110 and a UE 120, which are one of the Node Bs and one of the UEs in FIG. 1. In this design, UE 120 is equipped with T antennas 732a through 732t, and Node B 110 is equipped with R antennas 752a through 752r, where in general T>1 and R>1.

At UE 120, a transmit processor 720 may receive traffic data from a data source 712, process (e.g., encode and symbol map) the traffic data, and provide modulation symbols for traffic data. Transmit processor 720 may also receive control data (e.g., for ACK and/or CQI information) from a controller/processor 740, process the control data as described above, and provide modulation symbols for control data. Transmit processor 720 may also generate pilot symbols (e.g., for pilot sequences) and multiplex the pilot symbols with the modulation symbols for traffic and control data. A multiple-input multiple-output (MIMO) processor 722 may process (e.g., precode) the symbols from transmit processor 720 and provide T output symbol streams to T modulators (MOD) 730a through 730t. MIMO processor 722 may be omitted if UE 120 is equipped with a single antenna. Each modulator 730 may process its output symbol stream (e.g., for SC-FDM) to obtain an output sample stream. Each modulator 730 may further condition (e.g., convert to analog, filter, amplify, and upconvert) its output sample stream to generate an uplink signal. T uplink signals from modulators 730a through 730t may be transmitted via T antennas 732a through 732t, respectively.

At Node B 110, antennas 752a through 752r may receive the uplink signals from UE 120 and/or other UEs. Each antenna 752 may provide a received signal to a respective demodulator (DEMOD) 754. Each demodulator 754 may condition (e.g., filter, amplify, downconvert, and digitize) its received signal to obtain samples and may further process the samples (e.g., for SC-FDM) to obtain received symbols. A MIMO detector 756 may perform MIMO detection on the received symbols from all R demodulators 754a through 754r and provide detected symbols. A receive processor 760 may process (e.g., demodulate and decode) the detected symbols, provide decoded traffic data to a data sink 762, and provide decoded control data to a controller/processor 770. In general, the processing by MIMO detector 756 and receive processor 760 is complementary to the processing by MIMO processor 722 and transmit processor 720, respectively, at UE 120.

Node B 110 may transmit traffic data and/or control data on the downlink to UE 120. Traffic data from a data source 778 and/or control data from controller/processor 770 may be processed by a transmit processor 780 and further processed by a MIMO processor 782 to obtain R output symbol streams.

R modulators 754a through 754r may process the R output symbol streams (e.g., for OFDM) to obtain R output sample streams and may further condition the output sample streams to obtain R downlink signals, which may be transmitted via R antennas 752a through 752r. At UE 120, the downlink signals from Node B 110 may be received by antennas 732a through 732t, conditioned and processed by demodulators 730a through 730t, and further processed by a MIMO detector 736 (if applicable) and a receive processor 738 to recover the traffic data and control data sent to UE 120. Receive processor 738 may provide decoded traffic data to a data sink 739 and provide decoded control data to controller/processor 740.

Controllers/processors 740 and 770 may direct the operation at UE 120 and Node B 110, respectively. Memories 742 and 772 may store data and program codes for UE 120 and Node B 110, respectively. A scheduler 774 may schedule UEs for data transmission on the downlink and/or uplink and may assign resources to the scheduled UEs. Scheduler 774 may also assign control resources to the UEs for transmission of control information, e.g., ACK and/or CQI information. The control resources may comprise resource blocks, reference signal sequences, offsets for pseudo-random hopping, etc.

FIG. 8 shows a block diagram of a design of a transmit processor 820 for control data, e.g., for ACK and/or CQI information. Transmit processor 820 supports the hybrid FDM CDM structure shown in FIGS. 6A and 6B and may be part of transmit processor 720 at UE 120 in FIG. 7. Within transmit processor 820, a unit 822 may receive a cyclic shift index assigned to UE 120 and generate a reference signal sequence based on the cyclic shift index. An encoder 824 may receive and encode control data (e.g., for ACK and/or CQI information) and provide code bits. A symbol mapper 826 may map the code bits to modulation symbols. A multiplexer (Mux) 828 may provide the reference signal sequence in each symbol period for pilot and may provide an appropriate group of modulation symbols in each symbol period for data, e.g., as shown in FIG. 6A or 6B.

FIG. 9 shows a block diagram of a design of an SC-FDM modulator 930, which may be used for each of modulators 730a through 730t at UE 120 in FIG. 7. In each symbol period for pilot, a DFT unit 932 may receive the reference signal sequence containing N symbols, perform an N-point DFT on the N symbols, and provide N frequency-domain values. A symbol-to-subcarrier mapper 934 may map the N frequency-domain values to N subcarriers in a resource block assigned to UE 120 and may map zero values to remaining subcarriers. In each symbol period for data, DFT unit 932 may receive L modulation symbols for data (e.g., L=2 for the designs shown in FIGS. 6A and 6B), perform an L-point DFT on the L modulation symbols, and provide L frequency-domain values. Symbol-to-subcarrier mapper 934 may map the L frequency-domain values to L subcarriers assigned to UE 120 for data and may map zero values to remaining subcarriers. The L subcarriers may vary from symbol period to symbol period, e.g., as shown in FIGS. 6A and 6B.

In each symbol period, an inverse fast Fourier transform (IFFT) unit 936 may perform a K-point IFFT on the K mapped values for the K total subcarriers and provide K time-domain samples for a useful portion. A cyclic prefix generator 938 may copy the last C samples of the useful portion and append these C samples to the front of the useful portion to form an SC-FDM symbol containing K+C samples. The SC-FDM symbol may be sent in one symbol period, which may include K+C sample periods.

Figure 10:
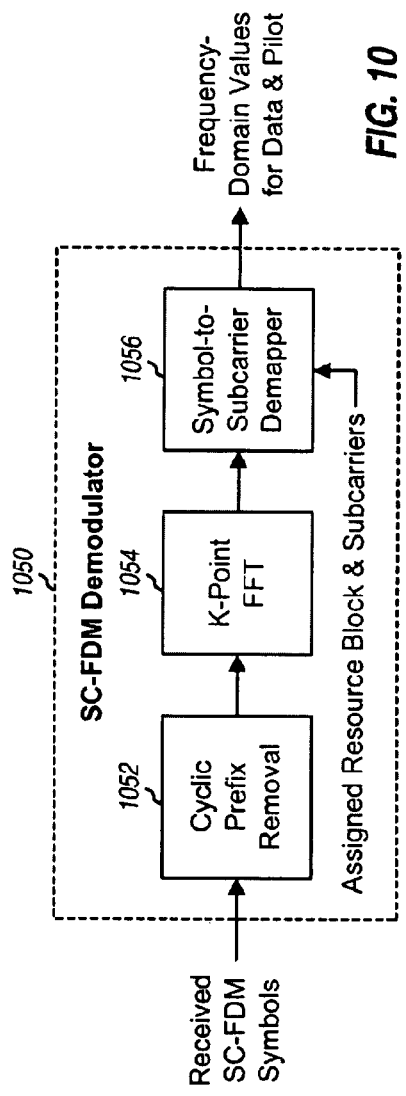
FIG. 10 shows a block diagram of an SC-FDM demodulator at the Node B.

FIG. 10 shows a block diagram of a design of an SC-FDM demodulator 1050, which may be used for each of demodulators 754a through 754r at Node B 110 in FIG. 7. In each symbol period, a cyclic prefix removal unit 1052 may obtain K+C received samples for an SC-FDM symbol, remove C received samples corresponding to the cyclic prefix, and provide K received samples for the useful portion. A fast Fourier transform (FFT) unit 1054 may perform a K-point FFT on the K received samples and provide K frequency-domain values for the K total subcarriers. In each symbol period for pilot, a symbol-to-subcarrier demapper 1056 may provide N frequency-domain values from the N subcarriers in a resource block assigned to UE 120 and may discard the remaining frequency-domain values. In each symbol period for data, symbol-to-subcarrier demapper 1056 may provide L frequency-domain values from the L subcarriers assigned to UE 120 for data and may discard the remaining frequency-domain values.

Figure 11:
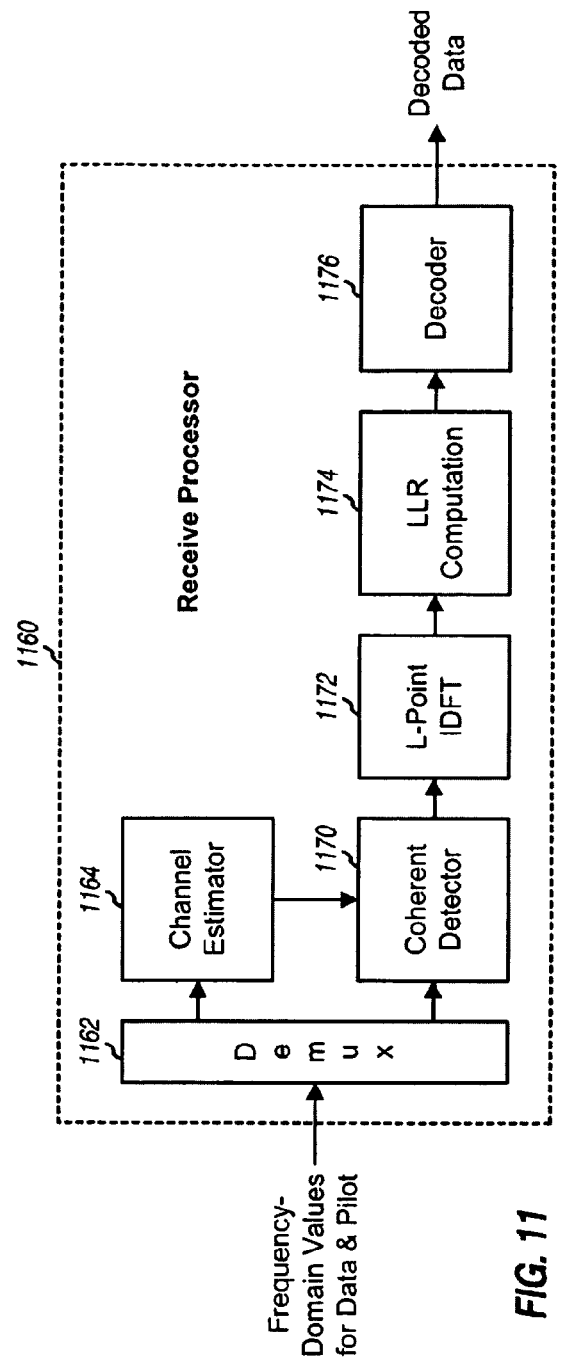
FIG. 11 shows a block diagram of a receive processor at the Node B.

FIG. 11 shows a block diagram of a design of a receive processor 1160 for control data, e.g., ACK and/or CQI information. Receive processor 1160 supports the hybrid FDM CDM structure shown in FIGS. 6A and 6B and may be part of receive processor 760 at Node B 110 in FIG. 7. Within receive processor 1160, a demultiplexer (Demux) 1162 may obtain frequency-domain values for pilot and data from a resource block pair assigned to UE 120. Demultiplexer 1162 may provide frequency-domain values for pilot to a channel estimator 1164 and may provide frequency-domain values for data to a coherent detector 1170.

Channel estimator 1164 may derive one or more channel estimates for the N subcarriers in each resource block based on the frequency-domain values for pilot from that resource block. In one design, channel estimator 1164 may derive a channel estimate for each resource block based on all frequency-domain values for pilot from that resource block. This design may be used for a slow varying channel, e.g., low mobility. In another design, channel estimator 1164 may derive a channel estimate for each symbol period in each resource block based on (e.g., by interpolating) the frequency-domain values for pilot from that resource block. This design may be used for a fast varying channel, e.g., high mobility. In any case, coherent detector 1170 may perform coherent detection on L frequency-domain values for data in each symbol period with an applicable channel estimate and provide L detected values. An inverse DFT (IDFT) unit 1172 may perform an L-point IDFT on the L detected values and provide L received symbols for data. A unit 1174 may compute log-likelihood ratios (LLRs) for code bits based on the received symbols for data. A decoder 1176 may decode the LLRs for all received symbols for data in the resource block pair and provide decoded data.

In general, Node B 110 may perform coherent detection in the frequency domain (e.g., as shown in FIG. 11) or in the time domain (not shown in FIG. 11). Node B 110 may also receive data and pilot from UE 120 via multiple antennas 752a through 752r. In this case, Node B 110 may combine results from the multiple antennas, e.g., after coherent detector 1170 in FIG. 11.

Figure 12:
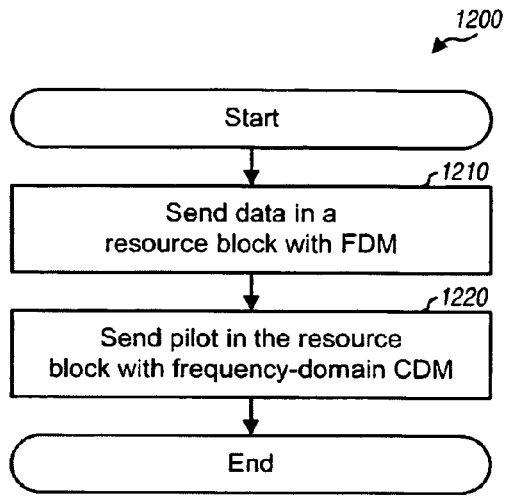
FIG. 12 shows a process for transmitting data and pilot by the UE.

FIG. 12 shows a design of a process 1200 for transmitting data and pilot in a wireless communication system. Process 1200 may be performed by a UE (as described below) or by some other entity. The UE may send data in a resource block with FDM (block 1210). The UE may send pilot in the resource block with frequency-domain CDM (block 1220). The resource block may comprise a plurality of (e.g., 12) subcarriers in a plurality of (e.g., six or seven) symbol periods. Each subcarrier in each symbol period may be used by at most one UE for sending data. The data may comprise CQI information, ACK information, and/or other information.

Figure 13:
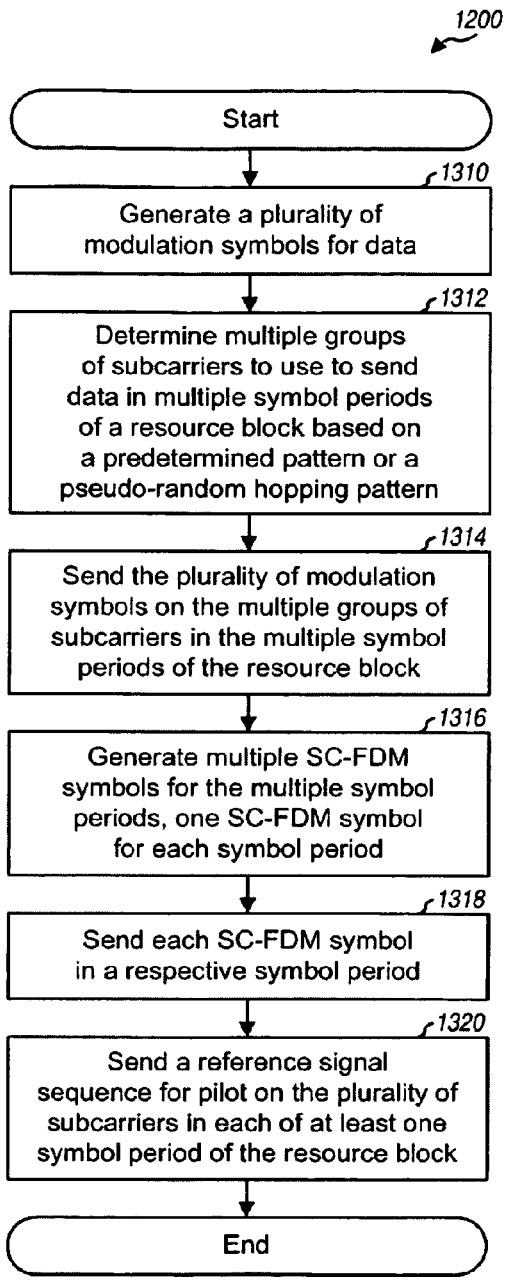
FIG. 13 shows another process for transmitting data and pilot by the UE.

FIG. 13 shows a design of a process 1300 for transmitting data and pilot. Process 1300 is one design of process 1200 in FIG. 12. Blocks 1310 to 1318 in FIG. 13 may be one design of block 1210 in FIG. 12. Block 1320 in FIG. 13 may be one design of block 1220 in FIG. 12.

The UE may generate a plurality of modulation symbols for data (block 1310). The UE may determine multiple groups of subcarriers to use to send data in multiple symbol periods of the resource block based on a predetermined pattern (e.g., as shown in FIG. 6A) or a pseudo-random hopping pattern (e.g., as shown in FIG. 6B) (block 1312). Each group may include at least two (e.g., two) consecutive subcarriers to support localized FDM. The multiple groups may include different subcarriers to provide frequency diversity and possibly interference averaging. The multiple groups may include sequentially increasing subcarriers (with wrap around) across the multiple symbol periods, e.g., as shown in FIG. 6A. In any case, the UE may send the plurality of modulation symbols (e.g., in the time domain) on the multiple groups of subcarriers in the multiple symbol periods of the resource block (block 1314). The UE may generate multiple SC-FDM symbols for the multiple symbol periods, one SC-FDM symbol for each symbol period (block 1316). Each SC-FDM symbol may comprise modulation symbols sent on one group of subcarriers. The UE may send each SC-FDM symbol in a respective symbol period (block 1318).

The UE may send a reference signal sequence for pilot on the plurality of subcarriers in each of at least one symbol period of the resource block (block 1320). At least one other reference signal sequence may be sent for pilot by at least one other UE on the plurality of subcarriers in each of the at least one symbol period. The reference signal sequence used by the UE and the at least one other reference signal sequence used by the at least one other UE may be different cyclic shifts of a base sequence, e.g., as shown in equation (1).

Figure 14:
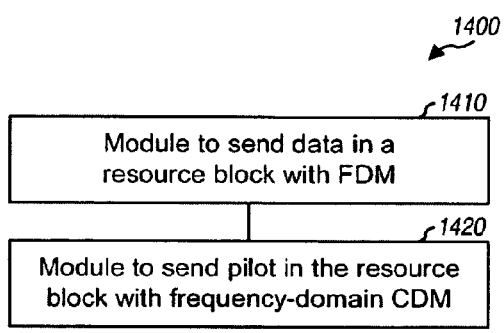
FIG. 14 shows an apparatus for transmitting data and pilot.

FIG. 14 shows a design of an apparatus 1400 for transmitting data and pilot in a wireless communication system. Apparatus 1400 includes a module 1410 to send data in a resource block with FDM, and a module 1420 to send pilot in the resource block with frequency-domain CDM.

Figure 15:
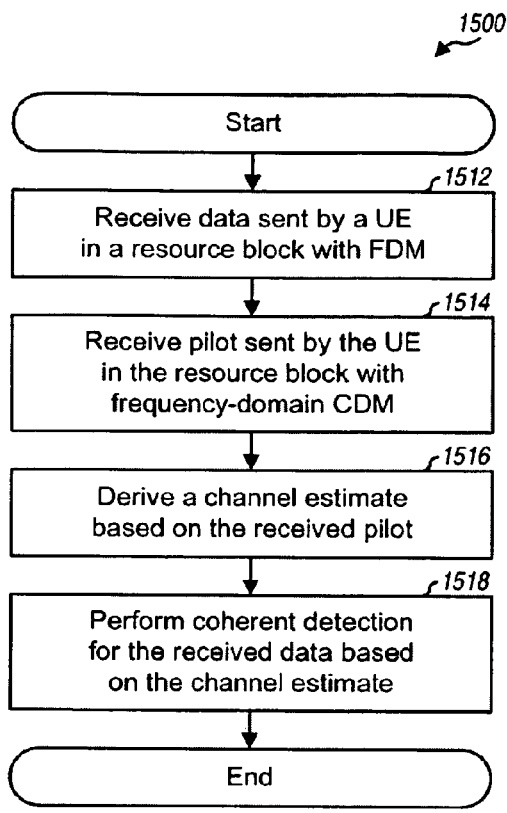
FIG. 15 shows a process for receiving data and pilot by the Node B.

FIG. 15 shows a design of a process 1500 for receiving data and pilot in a wireless communication system. Process 1500 may be performed by a Node B (as described below) or by some other entity. The Node B may receive data sent by a UE in a resource block with FDM (block 1512). The Node B may receive pilot sent by the UE in the resource block with frequency-domain CDM (block 1514). The Node B may derive a channel estimate based on the received pilot (block 1516) and may perform coherent detection for the received data based on the channel estimate (block 1518).

For block 1512, the Node B may receive a plurality of modulation symbols sent by the UE on multiple groups of subcarriers in multiple symbol periods of the resource block. The Node B may determine the multiple groups of subcarriers based on a predetermined pattern or a pseudo-random hopping pattern. Each group may include at least two consecutive subcarriers, and the multiple groups may include different subcarriers.

For block 1514, the Node B may receive a reference signal sequence sent for pilot by the UE on a plurality of subcarriers in each of at least one symbol period of the resource block. For block 1516, the Node B may multiply the received reference signal sequence in each of the at least one symbol period with the reference signal sequence sent by the UE. The Node B may then derive the channel estimate based on the multiplication results.

Figure 16:
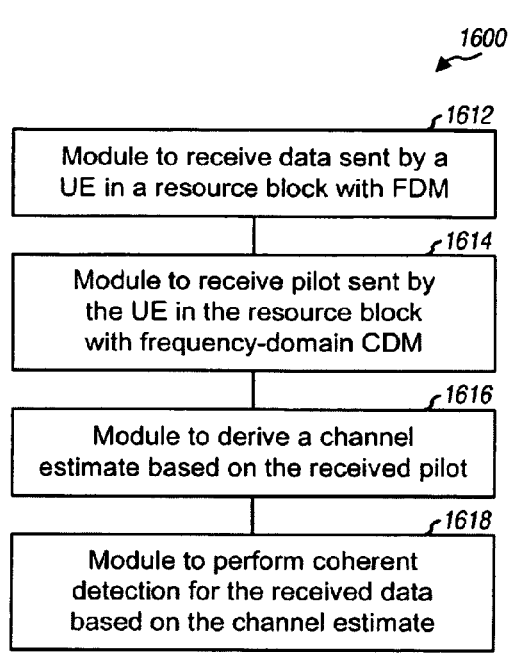
FIG. 16 shows an apparatus for receiving data and pilot.

FIG. 16 shows a design of an apparatus 1600 for receiving data and pilot in a wireless communication system. Apparatus 1600 includes a module 1612 to receive data sent by a UE in a resource block with FDM, a module 1614 to receive pilot sent by the UE in the resource block with frequency-domain CDM, a module 1616 to derive a channel estimate based on the received pilot, and a module 1618 to perform coherent detection for the received data based on the channel estimate.

The modules in FIGS. 14 and 16 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, bard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting data and pilot in a wireless communication system, comprising:
    sending data for multiple user equipment (UEs) in a resource block with frequency division multiplexing (FDM), wherein respective data for the multiple UEs is FDM-separated in each symbol period of the resource block that is used for sending data; and
    sending pilot in the resource block with frequency-domain code division multiplexing (CDM);
    wherein the sending data comprises:
    generating a plurality of modulation symbols for the data, and
    sending the plurality of modulation symbols on multiple groups of subcarriers in multiple symbol periods of the resource block;
    wherein the sending data further comprises:
    generating multiple single-carrier frequency division multiplexing (SC-FDM) symbols for the multiple symbol periods, one SC-FDM symbol for each symbol period, each SC-FDM symbol comprising modulation symbols sent on one group of subcarriers, and
    sending each SC-FDM symbol in a respective symbol period.

2. The method of claim 1, wherein the resource block comprises a plurality of subcarriers in a plurality of symbol periods, and wherein each subcarrier in each symbol period is used by at most one user equipment (UE) for sending data.

3. The method of claim 1, wherein each group includes at least two consecutive subcarriers.

4. The method of claim 1, wherein the multiple groups include different subcarriers in the resource block for frequency diversity.

5. The method of claim 1, further comprising:
    determining the multiple groups of subcarriers based on a predetermined pattern or a pseudo-random hopping pattern.

6. The method of claim 1, wherein the multiple groups include sequentially increasing subcarriers across the multiple symbol periods of the resource block.

7. The method of claim 2, wherein the sending pilot comprises sending a reference signal sequence for pilot on the plurality of subcarriers in each of at least one symbol period of the resource block, and wherein at least one other reference signal sequence is sent for pilot by at least one other user equipment (UE) on the plurality of subcarriers in each of the at least one symbol period.

8. The method of claim 7, wherein the reference signal sequence and the at least one other reference signal sequence are different cyclic shifts of a base sequence.

9. The method of claim 1, wherein the data comprises channel quantity indicator (CQI) information, or acknowledgement (ACK) information, or both CQI and ACK information.

10. An apparatus for wireless communication, comprising:
    at least one processor configured to send data in a resource block with frequency division multiplexing (FDM), and to send pilot in the resource block with frequency-domain code division multiplexing (CDM);
    wherein respective data from multiple User Equipment (UEs) is FDM-separated in each symbol period of the resource block that is used for sending data;
    wherein the at least one processor is configured to generate a plurality of modulation symbols for the data, and to send the plurality of modulation symbols on multiple groups of subcarriers in multiple symbol periods of the resource block;
    wherein the at least one processor is configured to generate multiple single-carrier frequency division multiplexing (SC-FDM) symbols for the multiple symbol periods, one SC-FDM symbol for each symbol period, each SC-FDM symbol comprising modulation symbols sent on one group of subcarriers, and to send each SC-FDM symbol in a respective symbol period.

11. The apparatus of claim 10, wherein each group includes at least two consecutive subcarriers, and wherein the multiple groups include different subcarriers in the resource block for frequency diversity.

12. The apparatus of claim 10, wherein the at least one processor is configured to determine the multiple groups of subcarriers based on a predetermined pattern or a pseudo-random hopping pattern.

13. The apparatus of claim 10, wherein the at least one processor is configured to send a reference signal sequence for pilot on a plurality of subcarriers in each of at least one symbol period of the resource block, and wherein at least one other reference signal sequence is sent for pilot by at least one other user equipment (UE) on the plurality of subcarriers in each of the at least one symbol period.

14. An apparatus for wireless communication, comprising:
means for sending data in a resource block with frequency division multiplexing (FDM); and
means for sending pilot in the resource block with frequency-domain code division multiplexing (CDM);
wherein respective data from multiple User Equipment (UEs) is FDM-separated in each symbol period of the resource block that is used for sending data;
wherein the means for sending data comprises:
means for generating a plurality of modulation symbols for the data, and
means for sending the plurality of modulation symbols on multiple groups of subcarriers in multiple symbol periods of the resource block
wherein the means for sending data further comprises:
means for generating multiple single-carrier frequency division multiplexing (SC-FDM) symbols for the multiple symbol periods, one SC-FDM symbol for each symbol period, each SC-FDM symbol comprising modulation symbols sent on one group of subcarriers, and
means for sending each SC-FDM symbol in a respective symbol period.

15. The apparatus of claim 14, wherein each group includes at least two consecutive subcarriers, and wherein the multiple groups include different subcarriers in the resource block for frequency diversity.

16. The apparatus of claim 14, further comprising:
means for determining the multiple groups of subcarriers based on a predetermined pattern or a pseudo-random hopping pattern.

17. The apparatus of claim 14, wherein the means for sending pilot comprises means for sending a reference signal sequence for pilot on a plurality of subcarriers in each of at least one symbol period of the resource block, and wherein at least one other reference signal sequence is sent for pilot by at least one other user equipment (UE) on the plurality of subcarriers in each of the at least one symbol period.

18. A computer program product comprising a tangible, non-transitory computer-readable medium comprising:
code for causing at least one computer to send data in a resource block with frequency division multiplexing (FDM), wherein respective data from multiple User Equipment (UEs) is FDM-separated in each symbol period of the resource block that is used for sending data, and
code for causing the at least one computer to send pilot in the resource block with frequency-domain code division multiplexing (CDM);
wherein the code for causing the at least one computer to send data comprises:
code for causing the at least one computer to generate a plurality of modulation symbols for the data, and
code for causing the at least one computer to send the plurality of modulation symbols on multiple groups of subcarriers in multiple symbol periods of the resource block;
wherein the code for causing the at least one computer to send data further comprises:
code for causing the at least one computer to generate multiple single-carrier frequency division multiplexing (SC-FDM) symbols for the multiple symbol periods, one SC-FDM symbol for each symbol period, each SC-FDM symbol comprising modulation symbols sent on one group of subcarriers, and
code for causing the at least one computer to send each SC-FDM symbol in a respective symbol period.

19. A method of receiving data and pilot in a wireless communication system, comprising:
receiving data sent by a user equipment (UE) in a resource block with frequency division multiplexing (FDM), wherein respective data from multiple User Equipment (UEs) is FDM-separated in each symbol period of the resource block that is used for sending data; and
receiving pilot sent by the UE in the resource block with frequency-domain code division multiplexing (CDM);
wherein the receiving data comprises:
receiving a plurality of modulation symbols sent by the UE on multiple groups of subcarriers in multiple symbol periods of the resource block, wherein the plurality of modulation symbols are generated for the data;
wherein the receiving data further comprises:
receiving each single-carrier frequency division multiplexing (SC-FDM) symbol in a respective symbol period, wherein multiple SC-FDM symbols are generated for multiple symbol periods, one SC-FDM symbol for each symbol period, each SC-FDM symbol comprising modulation symbols received on one group of subcarriers.

20. The method of claim 19, further comprising:
determining the multiple groups of subcarriers based on a predetermined pattern or a pseudo-random hopping pattern, the multiple groups including different subcarriers in the resource block for frequency diversity.

21. The method of claim 19, further comprising:
deriving a channel estimate based on the received pilot; and
performing coherent detection for the received data based on the channel estimate.

22. The method of claim 21, wherein the resource block comprises a plurality of subcarriers in a plurality of symbol periods, wherein the receiving pilot comprises receiving a reference signal sequence sent for pilot by the UE on the plurality of subcarriers in each of at least one symbol period of the resource block, and wherein the deriving the channel estimate comprises multiplying the received reference signal sequence in each of the at least one symbol period with the reference signal sequence sent the UE, and deriving the channel estimate based on multiplication results.

23. An apparatus for wireless communication, comprising:
at least one processor configured to receive data sent by a user equipment (UE) in a resource block with frequency division multiplexing (FDM), and to receive pilot sent by the UE in the resource block with frequency-domain code division multiplexing (CDM);
wherein respective data from multiple User Equipment (UEs) is FDM-separated in each symbol period of the resource block that is used for sending data;
wherein the at least one processor is configured to receive a plurality of modulation symbols sent by the UE on multiple groups of subcarriers in multiple symbol periods of the resource block, wherein the plurality of modulation symbols are generated for the data;
wherein the at least one processor is configured to receive each single-carrier frequency division multiplexing (SC-FDM) symbol in a respective symbol period, wherein multiple SC-FDM symbols are generated for multiple symbol periods, one SC-FDM symbol for each symbol period, each SC-FDM symbol comprising modulation symbols received on one group of subcarriers.

24. The apparatus of claim 23, wherein the at least one processor is configured to determine the multiple groups of subcarriers based on a predetermined pattern or a pseudo-random hopping pattern, the multiple groups including different subcarriers in the resource block for frequency diversity.

25. The apparatus of claim 23, wherein the at least one processor is configured to derive a channel estimate based on the received pilot, and to perform coherent detection for the received data based on the channel estimate.

26. The apparatus of claim 25, wherein the resource block comprises a plurality of subcarriers in a plurality of symbol periods, and wherein the at least one processor is configured to receive a reference signal sequence sent for pilot by the UE on the plurality of subcarriers in each of at least one symbol period of the resource block, to multiply the received reference signal sequence in each of the at least one symbol period with the reference signal sequence sent the UE, and to derive the channel estimate based on multiplication results.

* * * * *